United States Patent
Cheung (10) Patent No.: US 7,377,828 B2
(45) Date of Patent: *May 27, 2008

(54) MULTI-LAYERED SPORTS BOARD

(75) Inventor: Wah Kan Cheung, Richmond Hill (CA)

(73) Assignee: Bamba International (Canada) Ltd., Thornhill, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/591,864

(22) Filed: Nov. 2, 2006

(65) Prior Publication Data

US 2007/0026749 A1    Feb. 1, 2007

Related U.S. Application Data

(63) Continuation-in-part of application No. 10/797,995, filed on Mar. 11, 2004, now Pat. No. 7,150,666.

(51) Int. Cl.
*A63C 5/03* (2006.01)
(52) U.S. Cl. .......................... 441/74; 114/357
(58) Field of Classification Search ............. 441/65, 441/74, 68; 428/316.6, 308.4, 318.6, 319.3, 428/319.7, 319.9; 114/357
See application file for complete search history.

(56) References Cited

U.S. PATENT DOCUMENTS

| | | | |
|---|---|---|---|
| 4,850,913 A | 7/1989 | Szabad, Jr. | |
| 5,211,593 A | 5/1993 | Schneider et al. | |
| 5,275,860 A | 1/1994 | D'Luzansky et al. | |
| 5,295,883 A | 3/1994 | Moran | |
| 5,503,921 A | 4/1996 | Chang et al. | |
| 5,647,784 A | 7/1997 | Moran | |
| 5,658,179 A | 8/1997 | Glydon et al. | |
| 5,755,081 A * | 5/1998 | Rivett et al. | 53/477 |
| 5,882,776 A | 3/1999 | Bambara et al. | |
| 6,221,451 B1 | 4/2001 | Lauer et al. | |
| 6,492,013 B1 | 12/2002 | Ramesh | |
| 6,773,798 B2 | 8/2004 | Ramesh | |
| 6,955,576 B2 | 10/2005 | Yeh | |
| 2002/0121765 A1 | 9/2002 | Wolf | |
| 2002/0167136 A1 | 11/2002 | Lehr et al. | |

* cited by examiner

*Primary Examiner*—Ed Swinehart
(74) *Attorney, Agent, or Firm*—Phillips Lytle LLP (57) ABSTRACT

Sports board (15) comprising an elongated expanded closed-cell polyolefin foam layer (16) having a foam thickness and opposed surfaces (18, 19), a first polyolefin sheet layer (23) having a thickness less than the foam thickness and having an inner surface (25) and an outer surface (24), an intermediate metallocene-based polyolefin layer (20) having an inner surface (22) and an outer surface (21) and a thickness less than the foam thickness, the intermediate layer bonded on its inner surface to the foam layer and bonded on its outer surface to the inner surface of the first layer. The intermediate layer may comprise an ethylene-alpha olefin copolymer and may comprise a copolymer of ethylene and octene.

11 Claims, 9 Drawing Sheets

MULTI-LAYERED SPORTS BOARD

CROSS-REFERENCE TO RELATED APPLICATIONS

This application is a continuation-in-part of, and claims priority to, commonly owned and U.S. patent application Ser. No. 10/797,995, filed Mar. 11, 2004 now U.S. Pat. No. 7,150,666 and entitled "A Multi-Layered Sports Board." The entire content of such application is incorporated by reference herein.

TECHNICAL FIELD

The present invention relates to foam sports boards for recreational use and, more particularly, to a laminated board with improved bonding characteristics.

BACKGROUND ART

Body boards for riding waves and other recreational sports boards made of foam or other floatation material are known in the prior art. In general, such sports boards are composed of a number of layers thermally or adhesively bonded together. The boards generally have a closed-cell foam core covered by one or more layers adhesively or thermally bonded to the core.

A number of laminated boards are known in the prior art and a number of methods of laminating or bonding the various layers of the board together are known. Examples of such boards and methods of laminating them are shown and disclosed in U.S. Pat. Nos. 5,211,593, 5,658,179, 5,503,921, 4,850,913 and 5,275,860. In bonding the layers together it is desirable to provide a bond between two layers which is stronger than the strength of the layers themselves.

Boards and methods of manufacturing them known in the prior art have a number of deficiencies. It is also known in the prior art that an adhesive may be used to bond the various layers together. This method of bonding has a number of drawbacks, including the adverse affect of solvent vapors released into the air during the manufacturing process and the added weight to the board of an adhesive joint. In addition, many conventional adhesives eventually deteriorate from the adverse affect of salt water on the adhesive over time, causing delamination.

It is also known that heat may be used to bond the various layers together. However, boards known in the prior art generally require that the thermal laminating process by which they are made occur at very high and exact temperatures in order to properly bond the layers. The requirement for a high and exact bonding temperature necessitates a more elaborate laminating process and can cause undesirable shrinkage of the layers. This type of bonding is especially difficult when the layers are of different materials having different characteristics.

Accordingly, there is a need for a thermally laminated foam board with improved bonding between layers of different polymeric materials having different thermal characteristics.

DISCLOSURE OF THE INVENTION

With parenthetical reference to the corresponding parts, portions or surfaces of the disclosed embodiment, merely for the purposes of illustration and not by way of limitation, the present invention provides an improved sports board (15) comprising an elongated expanded closed-cell polyolefin foam layer (16) having a foam thickness, a foam density and opposed surfaces (18, 19), a first polyolefin non-foam film layer (23) having a thickness less than the foam thickness, a density greater than the foam density and having an inner surface (25) and an outer surface (24), an intermediate non-foam metallocene-based polyolefin layer (20) having an inner surface (22), an outer surface (21), a thickness less than the foam thickness and a density greater than the foam density, the intermediate layer bonded on its inner surface to the foam layer and bonded on its outer surface to the inner surface of the first layer. The intermediate layer may comprise an ethylene-alpha olefin copolymer and may comprise a copolymer of ethylene and octene. The foam layer may comprise a homopolymer or copolymer of polyethylene, polypropylene and ethyl vinyl acetate. The first layer may comprise a homopolymer or copolymer of polyethylene film and polypropylene film. The intermediate layer may be thermally bonded to the foam layer and the first layer. The board may further comprise a graphically imprinted layer (26) bonded to the outer surface of the first layer.

In another aspect, the sports board (110) comprises an elongated expanded closed-cell polyolefin foam layer (112) having a foam thickness, a foam density and opposed surfaces, a non-foam mesh layer (114) having a pattern defined by thermoplastic material and openings in the material, an intermediate non-foam metallocene-based polyolefin layer (113) between the foam layer and the mesh layer and having a density greater than the foam density.

In another aspect, the board (90) comprises a first non-foam layer (97) having a thickness between about 0.02 and about 0.75 mm and imprinted with a graphic element (98), a second non-foam layer (94) having an inner surface and an outer surface, an intermediate non-foam metallocene-based polyolefin layer (95) having a first surface and a second surface, and the intermediate layer bonded on its first surface to the inner surface of the first layer and bonded on its second surface to the second layer. The first layer may comprise an outer layer having an outer surface, an inner surface and a graphic image printed on the inner surface, and an inner layer having an outer surface and an inner surface, the outer surface of the inner layer bonded to the inner surface of the outer layer and the inner surface of the inner layer bonded to the first surface of the intermediate layer.

In another aspect, the sports board (130) comprises a first non-foam layer (136) having an inner surface, an outer surface and a thickness between about 0.2 mm and about 1.5 mm, a second non-foam layer (134) having an inner surface, an outer surface and an imprinted graphic image (137), an intermediate non-foam metallocene-based polyolefin layer (135) having a first surface and a second surface, and the intermediate layer bonded on its first surface to the inner surface of the first layer and bonded on its second surface to the second layer. The second layer may comprise an outer layer (133) having an outer surface and an inner surface, an inner layer (134) having an inner surface, an outer surface and a graphic image (137) printed on its outer surface, the outer surface of the inner layer bonded to the inner surface of the outer layer and the inner surface of the inner layer bonded to the second surface of the intermediate layer. The board may further comprise a polyolefin foam layer (132) having a first surface and a second surface thermally bonded to the outer surface of the outer layer. The board may further comprise a polyolefin foam core (131) having a top surface, edge surfaces and a bottom surface thermally bonded to the first surface of the polyolefin foam layer.

Accordingly, the general object of the present invention is to provide an improved sports board with foam tear strength bonds.

Another object is to provide an improved sports board in which different polyolefin materials may be used in the layers without a derogation in bonding strength.

Another object is to provide an improved sports board which permits the layers to be laminated together at lower and less exact temperature ranges.

Another object is to provide an improved sports board which may be manufactured using conventional means with improved bond strength and flexibility along the bond line between the laminates.

Another object is to provide an improved sports board which has a smooth surface.

Another object is to provide an improved sports board which is manufacturable without deleterious foam shrinkage.

DESCRIPTION OF THE PREFERRED EMBODIMENTS

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
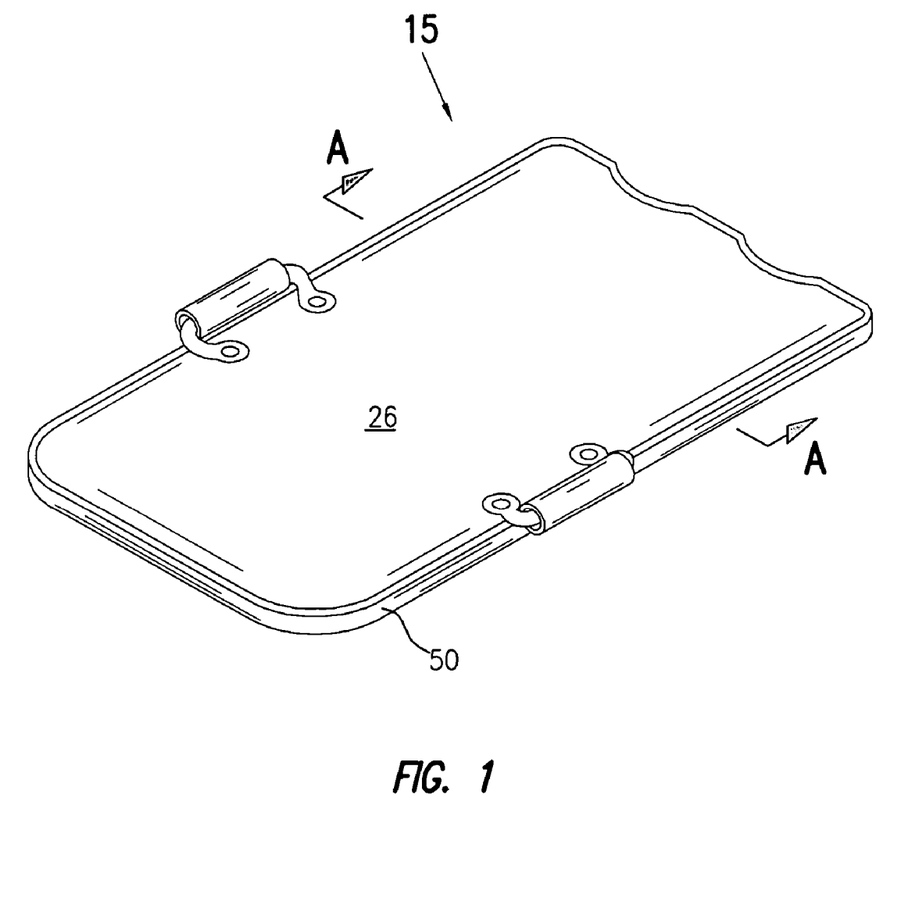
FIG. 1 is a perspective view of a first embodiment of the sports board.
Figure 2:
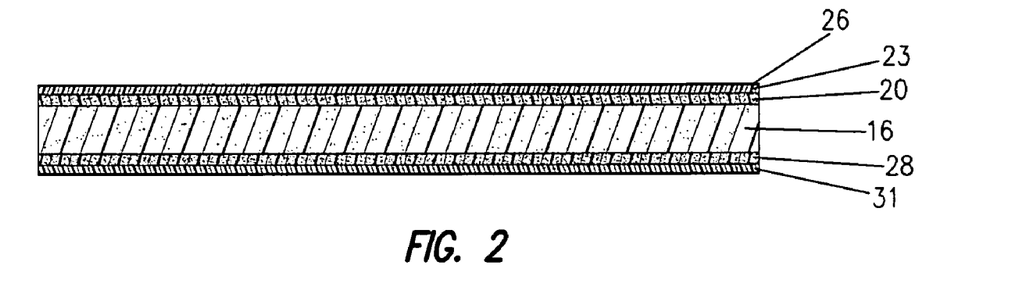
FIG. 2 is a partial vertical sectional view of the sports board shown in FIG. 1, taken generally on line A-A of FIG. 1.
Figure 3:
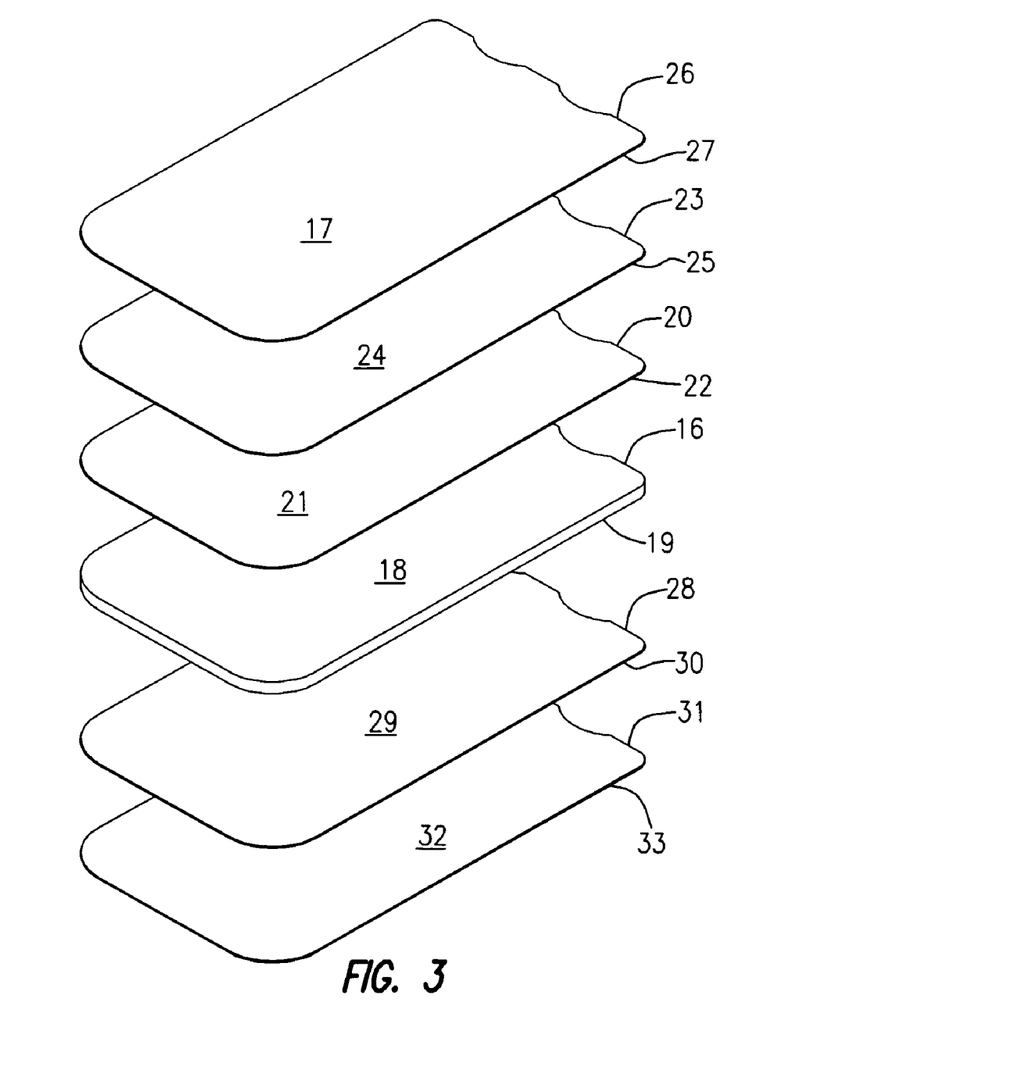
FIG. 3 is an exploded view of the sports board shown in FIG. 1.

Referring now to the drawings and, more particularly, to FIG. 1 thereof, this invention provides an improved sports board, the presently preferred embodiment of which is generally indicated at 15. As shown in FIGS. 1-3, sports board 15 is comprised of six layers laminated together.

Top layer 26 is graphically imprinted polyethylene film. The graphics on layer 26 are imprinted using any of several conventional processes for printing on polyethylene. An example of such a process is corona printing, in which an electrical discharge temporarily alters the surface molecules of the polyethylene film, allowing inks to adhere to the film. Layer 26 has a thickness of between 0.5 and 4 mils, and preferably a thickness of 1 mil. Layer 26 has a density in the range of 0.942 to 0.962 g/cm$^3$, and preferably a density of 0.952 g/cm$^3$. Layer 26 is heat laminated to the outer surface 24 of layer 23.

Layer 23 is a blend of low density polyethylene and ethylene vinyl acetate. Layer 23 comprises about 1 to 25% by weight ethylene vinyl acetate, with the remaining portion being made up of low density polyethylene. Layer 23 has a thickness of between 10 and 60 mils, and preferably a thickness of 20 mils. Layer 23 has a density of between 0.912 and 0.932 g/cm$^3$, and preferably a density of 0.922 g/cm$^3$. The inner surface 25 of layer 23 is laminated to the outer surface 21 of layer 20.

Layer 20 is metallocene-catalyzed polyolefin. In the preferred embodiment, layer 20 is an ethylene-olefin copolymer of ethylene and octene produced in a conventional solution polymerization process using a metallocene catalyst. Metallocene is used as an olefin polymerization catalyst to form a metallocene-based copolymer. Layer 20 has a thickness between 0.5 and 12 mils, and preferably a thickness of 1 mil. Layer 20 has a preferred density of 0.882 g/cm$^3$. Inner surface 22 of layer 20 is laminated to outer surface 18 of layer 16.

Layer 16 is closed-cell polyethylene foam, and acts as the core of board 15. Core 16 may be beaded type, extruded type or cross-linked polyethylene foam. Core 16 has a thickness of between ⅛ and 2 inches, and preferably a thickness of 1 inch. Core 16 has a density of between 1.6 and 4 lb/ft$^3$, and preferably a density of 2.2 lb/ft$^3$. It is contemplated that foam core 16 may be formed from two ½ inch layers laminated together to form a 1 inch thick foam core. The outer surface 19 of layer 16 is in turn laminated to the inner surface 29 of layer 28.

Layer 28 is of the same structure and composition as layer 20. The outer surface 30 of layer 28 is laminated to the inner surface 32 of layer 31. This intermediate layer provides a superior bond between polyethylene foam and polyethylene film.

Layer 31 is polyethylene film. Layer 31 has a thickness between 8 to 60 mils, and preferably a thickness of 30 mils. Layer 31 has a density of between 0.942 and 0.962 g/cm$^3$, and preferably a density of 0.952 g/cm$^3$.

Both layers 31 and 26 are high density polyethylene film. The bottom surface 33 of layer 31 provides the bottom surface for board 15. Top surface 17 of layer 26 provides the top surface of board 15.

Sports board 15 is formed in a series of steps. First, layers 28 and 31 are co-extruded to form a bottom laminated skin, using a conventional co-extrusion process, and are cut to the desired length. The co-extruded layers 31 and 28 are then heat laminated to the bottom surface 19 of core 16 using a conventional heat laminating process with rollers, forming a laminated sheet of layers 16, 28 and 31.

Layer 26 is imprinted with the desired graphics using a conventional imprinting procedure. Layer 26 is then fed from a roll and heat laminated with rollers to the top surface 24 of layer 23 as layers 23 and 20 are co-extruded, using a conventional co-extrusion process, thereby forming a laminated sheet of layers 26, 23 and 20. The sheet of laminated layers 26, 23 and 20 is then heat laminated to the top surface 18 of core 16. The resulting laminated board, consisting of layers 26, 23, 20, 16, 28 and 31, is then die cut to a desired shape. The side edges of the board are then shaped to the desired configuration and slope. Finally, a polyethylene foam strip 50 is heat laminated to cover the shaped side edges of laminated layers 26, 23, 20, 16, 28 and 31 of snow sled 15 and excess material is cut free.

Figure 4:
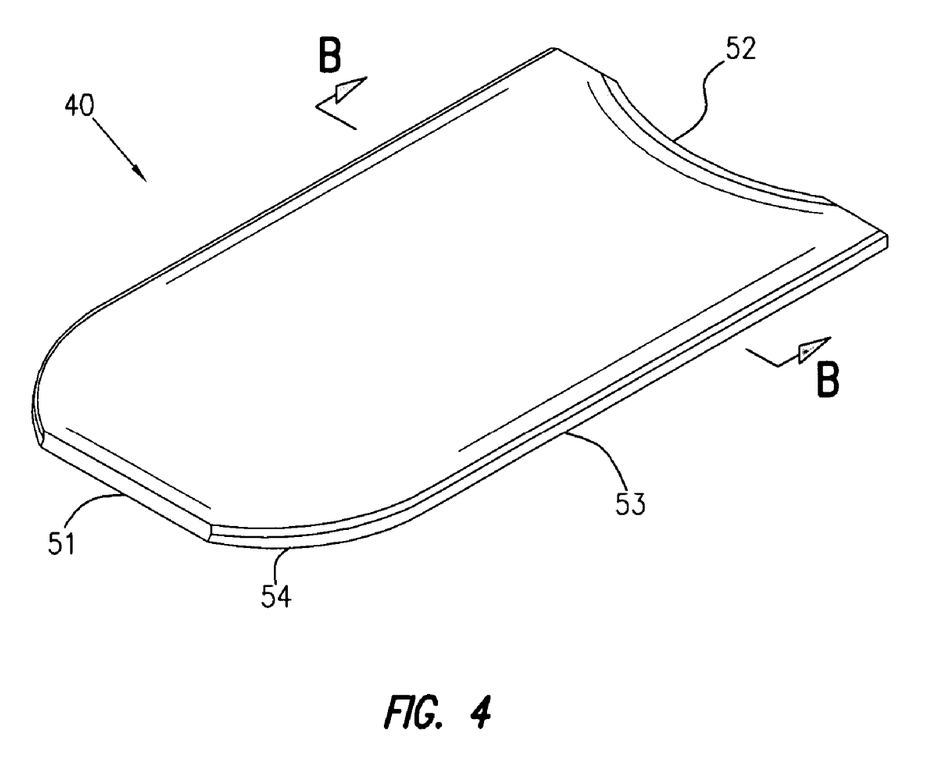
FIG. 4 is a perspective view of a second embodiment of the sports board.
Figure 5:
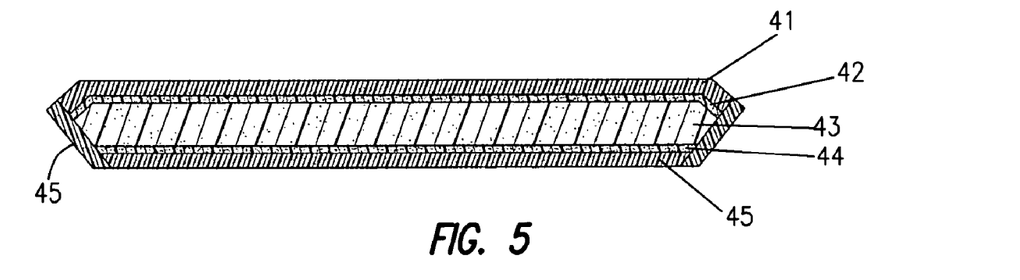
FIG. 5 is a vertical sectional view of the sports board shown in FIG. 4, taken generally on line B-B of FIG. 4.
Figure 6:
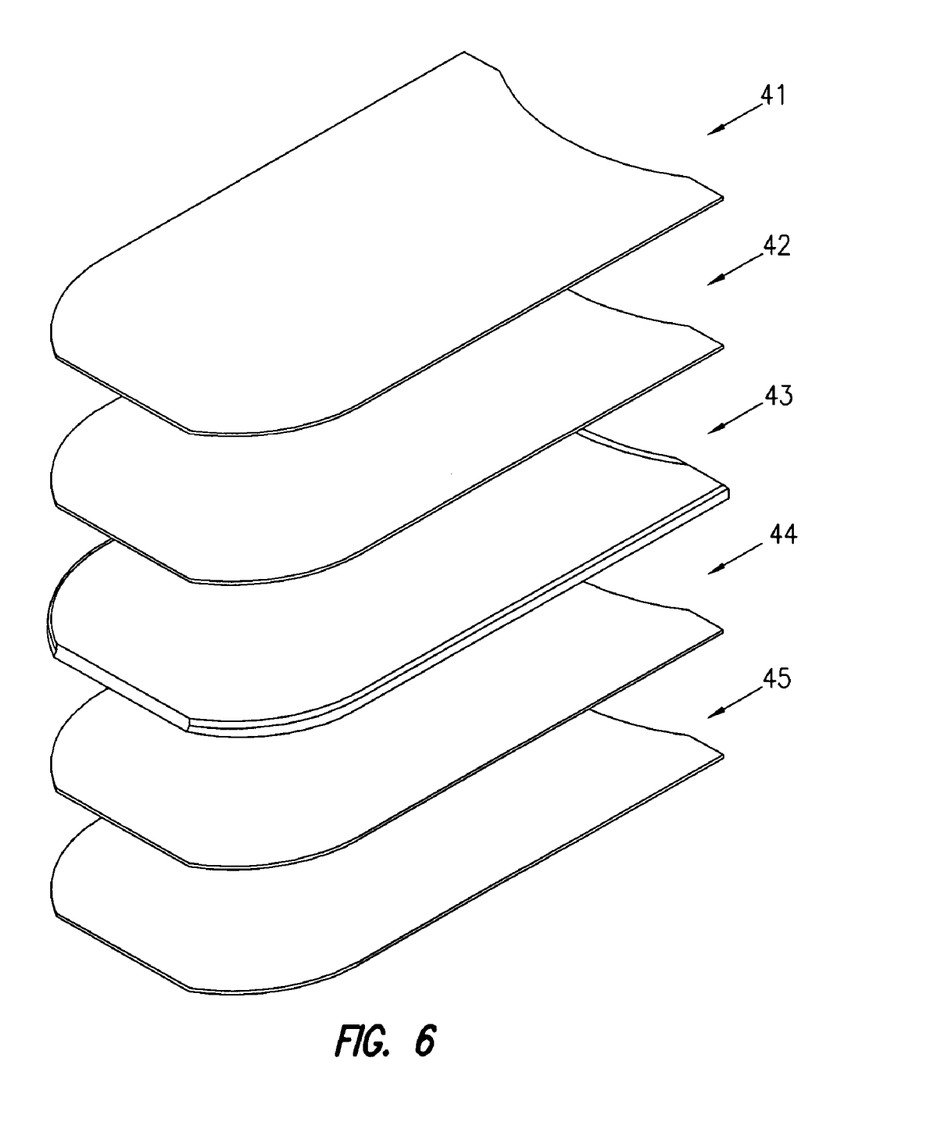
FIG. 6 is an exploded view of the sports board shown in FIG. 4.

FIGS. 4-6 show an alternate embodiment 40. In this embodiment, board 40 has five laminated layers rather than six. Intermediate layers 42 and 44 are of the same structure and composition as layers 20 and 28 in the first embodiment 15. Intermediate layer 42 facilitates a strong bond between polypropylene foam core 43 and polyethylene foam layer 41. Intermediate layer 44 facilitates a strong bond between polypropylene foam core 43 and polyethylene film layer 45.

Layer 41 is closed-cell polyethylene foam having a thickness in the range of 2 to 8 mm, and preferably 4.5 mm. Layer 41 has a density in the range 4 to 10 lb/ft$^3$, and preferably a density of 7 lb/ft$^3$.

Layer 42 is laminated on its outer surface to the inner surface of layer 41 and is laminated on its inner surface to the upper surface of core 43.

Core 43 is polypropylene foam having a thickness between 1 and 2.5 inches, and preferably a thickness of 2 inches. Polypropylene foam core 43 has a density of between 1.5 and 3 lb/ft$^3$, and preferably a density of 1.9 lb/ft$^3$.

Intermediate layer 44 is laminated on its inner surface to the bottom surface of core 43 and on its outer surface to the inner surface of layer 45.

Layer 45 is solid polyethylene film having a thickness between 12 and 32 mils, and a preferred thickness of 20 mils. Layer 45 has a density of between 0.942 and 0.962 g/cm$^3$, and a preferred density of 0.952 g/cm$^3$.

Body board 40 is formed in a series of steps. First, layer 43 is die cut to desired configuration. The front or nose of die-cut core 43 is then ground to form rocker 54. Layers 44 and 45 are then co-extruded to form a bottom skin, using a conventional co-extrusion process, and are cut to the desired length. The co-extruded layers 44 and 45 are then heat laminated to the bottom surface of pre-shaped core 43 using a conventional heat laminating process with rollers. Laminated layers 43, 44 and 45 are then shaped to form the desired nose 51, tail 52, and side rail 53 configurations.

Layer 42 is then extruded conventionally and heat laminated with rollers to layer 41 to produce a top laminate. The top laminate of layers 41 and 42 are then cut to the desired size. This top laminate is sized so that its outer edge will extend over the peripheral edge of core 43 enough so that it can be wrapped over, and heat laminated to, the nose 51 side edge, the tail 52 side edge and the upper portion of side rails 53 of laminated layers 44, 45 and 43. The top laminate of layers 41 and 42 are then heat laminated to the top surface of core 43. The outer portions of the top laminate are then wrapped over and laminated to the side edges of nose 51, tail 52 and the upper side surfaces of side rails 53. A polyethylene foam strip 55 is then heat laminated to cover the lower side surfaces of side rails 53 of board 40. Excess is then trimmed as necessary, completing the covering of the side surfaces of board 40.

Intermediate layers 20, 28, 42, and 44 facilitate the bonding of different polyolefin materials, including as discussed above polyethylene foam and film, polypropylene foam and polyethylene foam, and polypropylene foam and polyethylene film, using conventional thermal laminating processes. It is believed that such superior bonding is the result of the intermediate layers having a lower melt temperature than other materials, low shear viscosity, good wetting characteristics, and a linear molecular structure that diffuses quickly and forms a better physical bond with the molecules in the adjacent layers when cooled. Thus, intermediate layers 20, 28, 42, and 44 provide a superior heat laminated bond between the outer layers 23, 31 and 41, 45 and inner cores 16 and 43, respectively.

Figure 7:
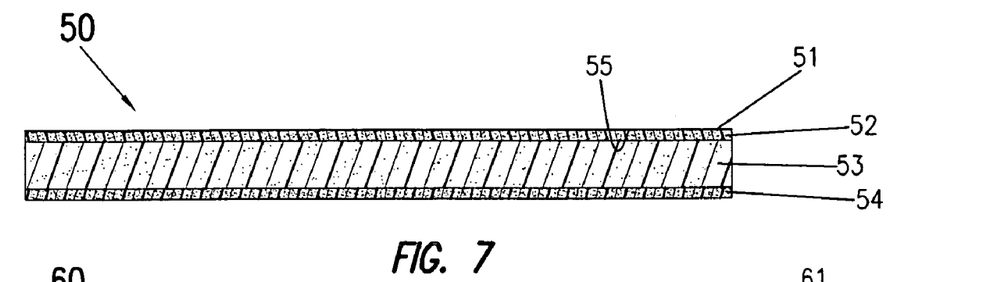
FIG. 7 is a vertical sectional view of a third embodiment of the sports board, taken generally on line A-A of FIG. 1.

FIG. 7 shows an alternate embodiment 50. Board 50 has four laminated layers. Layer 51 is a polyolefin film having a thickness in the range of about 0.02 to 0.15 mm, and preferably about 0.07 mm. Layer 51 has a density in the range of about 0.91 to 0.98 g/cm$^3$, and preferably a density of about 0.95 g/cm$^3$.

Layer 52 is an adhesive resin layer which has the same composition as layers 20 and 28 in the first embodiment. Layer 52 has a thickness of about 0.02 to 0.3 mm, and preferably a thickness of about 0.07 mm. Layer 52 has a density of about 0.882 g/cm$^3$.

Layer 53 is polyethylene foam having a thickness in the range of about 2 to 8 mm, and preferably a thickness of about 4.5 mm. Layer 53 has a density in the range of about 1.5 to 10 lb/ft$^3$, and preferably a density of about 6 lb/ft$^3$.

Layer 54 is a non-foam polyethylene sheet having a thickness between about 0.2 and 1.5 mm, and preferably a thickness of about 0.35 mm. Layer 54 has a density in the range of about 0.91 to 0.98 g/cm$^3$, and preferably a density of 0.95 g/cm$^3$. A graphic image is imprinted on inner surface 55 of layer 51.

Figure 8:
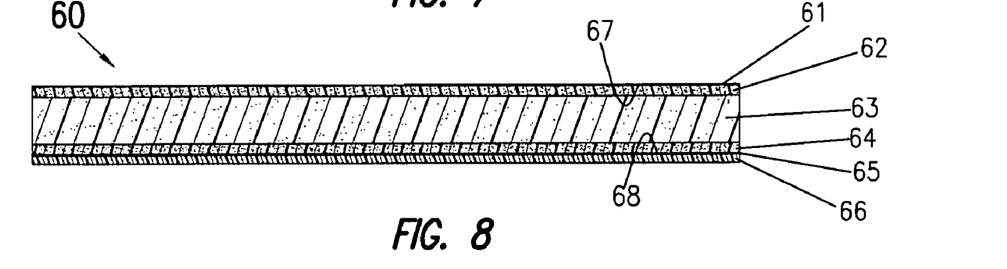
FIG. 8 is a vertical sectional view of a fourth embodiment of the sports board, taken generally on line A-A of FIG. 1.

FIG. 8 shows an alternative embodiment 60. Board 60 has six laminated layers. Adhesive resin layers 62 and 64 are of the same structure and composition as layer 52 in embodiment 50.

Layer 61 is a non-foam polyolefin layer having the same structure and composition as layer 51 in embodiment 50. Layer 63 is polyethylene foam having the same structure and composition as layer 53 in embodiment 50.

Layer 65 is a polyethylene film layer having a thickness between about 0.02 and 0.15 mm, and preferably a thickness of about 0.07 mm. Non-foam layer 65 has a density in the range of about 0.91 to 0.98 g/cm$^3$, and preferably a density of about 0.95 g/cm$^3$.

Layer 66 is a polyethylene non-foam layer having a thickness of about 0.2 to 1.5 mm, and preferably a thickness of about 0.35 mm. Layer 66 has a density in the range of about 0.91 to 0.98 g/cm$^3$, and preferably a density of about 0.95 g/cm$^3$.

Graphics are imprinted on the inner surface 67 of layer 61 and to the inner surface 68 of layer 65.

Figure 9:
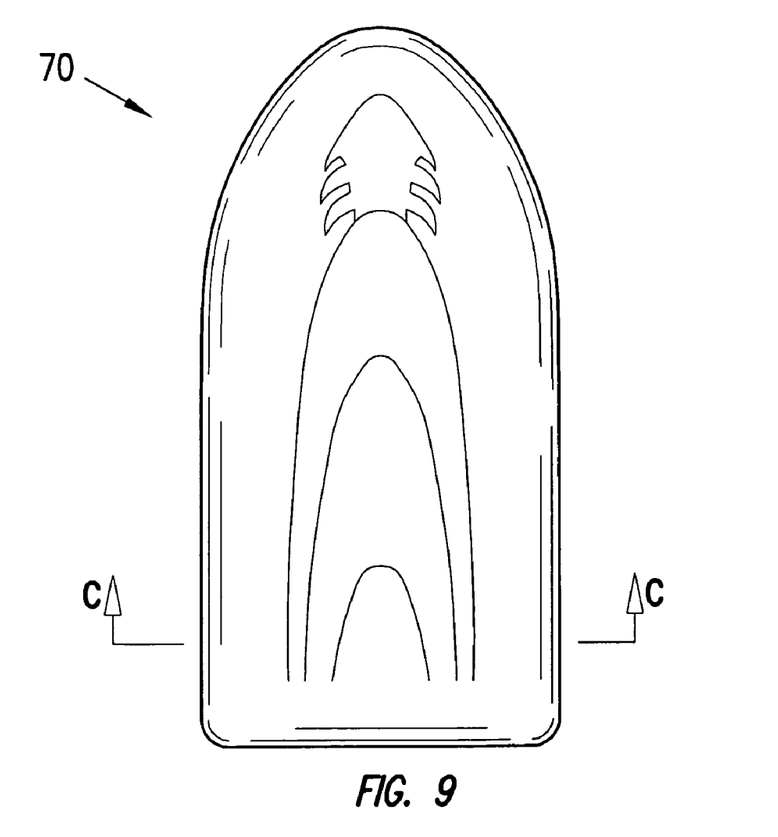
FIG. 9 is a perspective view of a fifth embodiment of the sports board.
Figure 10:
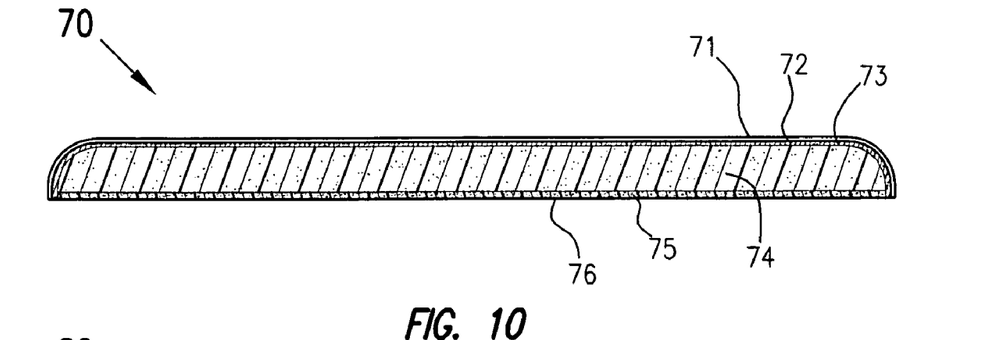
FIG. 10 is a vertical sectional view of the sports board shown in FIG. 9, taken generally on line C-C of FIG. 9.

FIGS. 9-10 show an alternate foam sled embodiment 70. Board 70 has six laminated layers. Layer 71 is of the same structure and composition as layer 51 in the third embodiment 50. Layer 72 is of the same structure and composition as layer 52 in the third embodiment 50.

Layers 73 and 75 are polyethylene foam sheets having a thickness in the range of about 1 to 5 mm, and preferably a thickness of about 3 mm. Layers 73 and 75 have a density in the range of about 4 to 10 lb/ft$^3$, and preferably a density of about 6 lb/ft$^3$.

Layer 74 is a polyethylene foam core having a thickness in the range of about 0.5 to 2 inches, and preferably a thickness of 1 inch. Foam core 74 has a density in the range of about 1.6 to 4 lb/ft$^3$, and preferably a density of about 2.2 lb/ft$^3$.

Layer 76 is a non-foam polyethylene sheet having a thickness in the range of about 0.2 to 1.5 mm, and preferably a thickness of about 0.5 mm. Layer 76 has a density in the range of about 0.91 to 0.98, and preferably a density of 0.95 g/cm$^3$.

Figure 11:
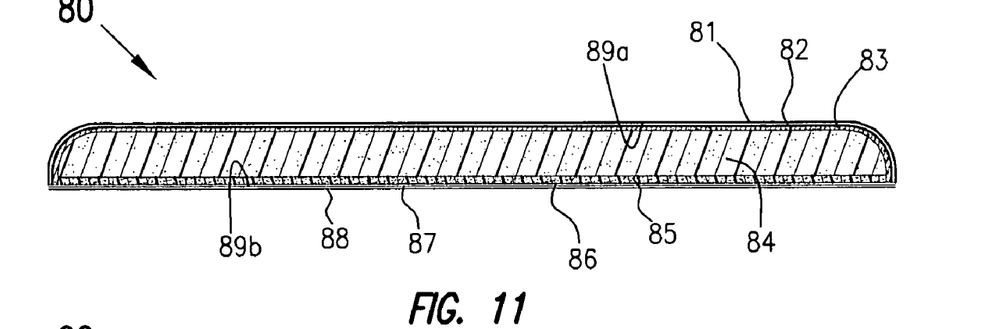
FIG. 11 is a vertical sectional view of a sixth embodiment of the sports board, taken generally on line C-C of FIG. 9.

FIG. 11 shows an alternate foam sled embodiment 80. Foam sled 80 has eight laminated layers. Layer 81 has the same structure and composition as layer 51 in the third embodiment 50. Layers 82 and 86 have the same structure and composition as layer 52 in the third embodiment 50. Layers 83 and 85 have the same structure and composition as layers 73 and 75 in embodiment 70. Layer 84 has the same structure and composition as layer 74 in embodiment 70. Layer 87 has the same structure and composition as layer 65 in the fourth embodiment 60. Layer 88 has the same structure and composition as layer 76 in the fifth embodiment 70. Graphic images are imprinted on the inner surface 89a of layer 81 and on the inner surface 89b of layer 87.

Figure 12:
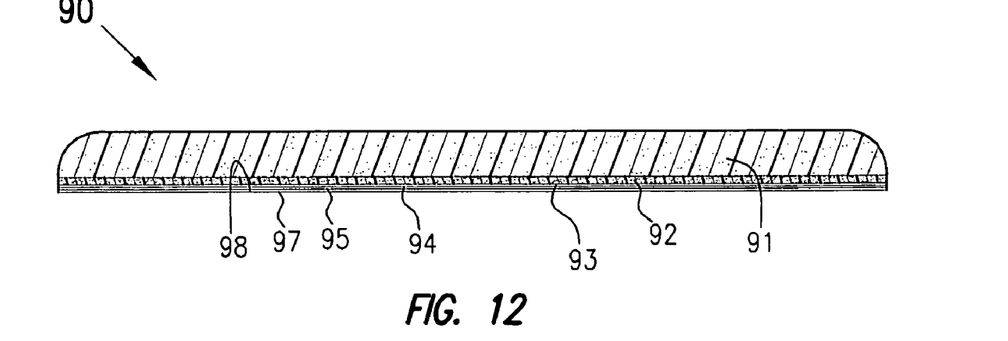
FIG. 12 is a vertical sectional view of a seventh embodiment of the sports board.

FIG. 12 shows all but the top skin of an alternative foam sled embodiment 90. As shown, the bottom skin comprises five layers laminated together. Layer 91 has the same structure and composition as layer 84 in the sixth embodiment 80. Layer 92 has the same structure and composition as layer 85 in the sixth embodiment 80. Layer 93 has the same structure and composition as layer 86 in the sixth embodiment 80.

Layer 94 is a polyethylene non-foam sheet having a thickness in the range of about 0.2 to 1.4 mm, and preferably a thickness of about 0.3 mm. Layer 94 has a density in the range of about 0.91 to 0.98 g/cm$^3$, and preferably a density of about 0.95 g/cm$^3$.

Layer 95 has the same structure and composition as layer 93.

Layer 97 is a polymer non-foam film layer having a thickness in the range of about 0.02 to 0.75 mm, and preferably a thickness of about 0.25 mm. Layer 97 has a density in the range of about 0.91 to 0.98 g/cm$^3$, and preferably a density of about 0.95 g/cm$^3$. Graphics are imprinted to the inner surface 98 of layer 97. Suitable polymers for film layer 97 include high density polyethylene (HDPE) and polyethylene terephthalate (PET). In the preferred embodiment, film layer 97 is a high density polyethylene polymer.

As shown, thinner transparent protection polymer film layer 97 is applied as the outer bottom layer of the sports board. Because this thinner plastic film 97 is able to be applied, graphic image 98, which is printed on the inner surface of thin protective polymer film 97, is more visible on the bottom surface of the board, thereby greatly improving the graphic definition. To fulfill the strength requirements for the board, however, a thicker non-foam polyethylene sheet 94 is laminated between foam sheet 92 and polymer film layer 97. This embodiment provides superior graphic definition over the prior art while maintaining the strength of the sled.

Figure 17:
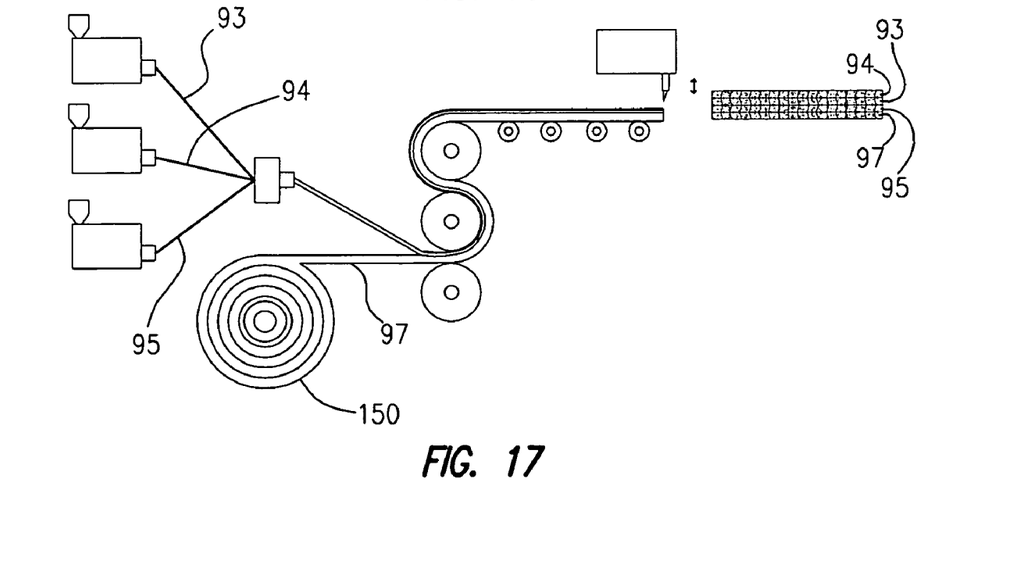
FIG. 17 is a schematic showing the process by which certain components of the sports board are laminated together.
Figure 18:
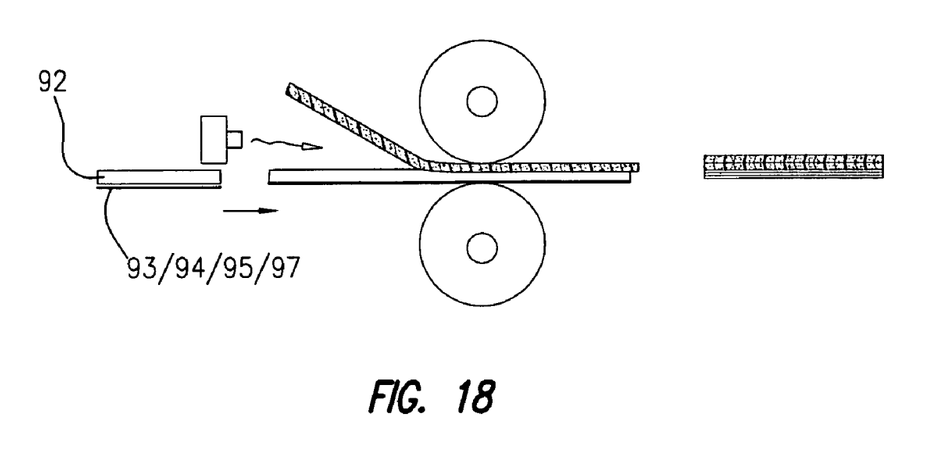
FIG. 18 is a schematic showing the process by which certain components of the sports board are laminated together.

Board 90 is formed in series of steps. First, as shown in FIG. 17, graphic polymer film 97 is fed from a roller 150 as resin layer 95, polyethylene sheet 94 and resin layer 93 are co-extruded, using a conventional co-extrusion process, onto the inner surface of layer 97 to form a laminate sheet 93/94/95/97. As shown in FIG. 18, this laminated sheet 93/94/95/97 is then heat laminated to polyethylene foam layer 92. The exposed surface of layer 93 in laminate 93/94/95/97 is applied and heat laminated to the outer surface of foam layer 92. The resulting laminate 92/93/94/95/97 is then conventionally heat laminated to the bottom of polyethylene foam core 91.

Figure 13:
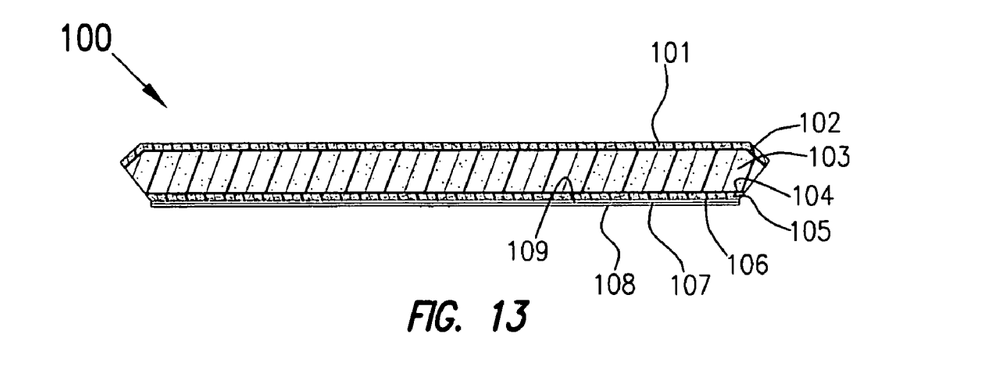
FIG. 13 is a vertical sectional view of an eighth embodiment of the sports board, taken generally on line B-B of FIG. 4.

FIG. 13 shows an alternate body board embodiment 100. In this embodiment, body board 100 has eight laminated layers. Layers 102, 104 and 106 have the same structure and composition as layer 52 in the third embodiment 50.

Layer 101 is a polyolefin foam sheet having a thickness in the range of about 2 to 8 mm, and preferably a thickness of about 4.5 mm. Layer 101 has a density in the range of about 4 to 10 lb/ft$^3$, and preferably a density of about 7 lb/ft$^3$.

Layer 103 is a polypropylene foam core having a thickness in the range of about 1 to 2.5 inches, and preferably a thickness of about two inches. Core 103 has a density in the range of about 1.5 to 3 lb/ft$^3$, and preferably a density of about 1.9 lb/ft$^3$.

Layer 105 is a polyolefin foam sheet having a thickness in the range of about 1 to 5 mm, and preferably a thickness of about 3 mm. Layer 105 has a density in the range of about 4 to 10 lb/ft$^3$, and preferably a density of about 8 lb/ft$^3$.

Layer 107 has the same structure and composition has layer 87 in the sixth embodiment 80. Layer 107 includes a graphic image 109 imprinted on its inner surface.

Layer 108 is a polyethylene non-foam sheet having a thickness in the range of about 0.3 to 0.8 mm, and preferably a thickness of about 0.5 mm. Layer 108 has a density in the range of about 0.91 to 0.98 g/cm$^3$, and preferably a density of about 0.95 g/cm$^3$.

Figure 14:
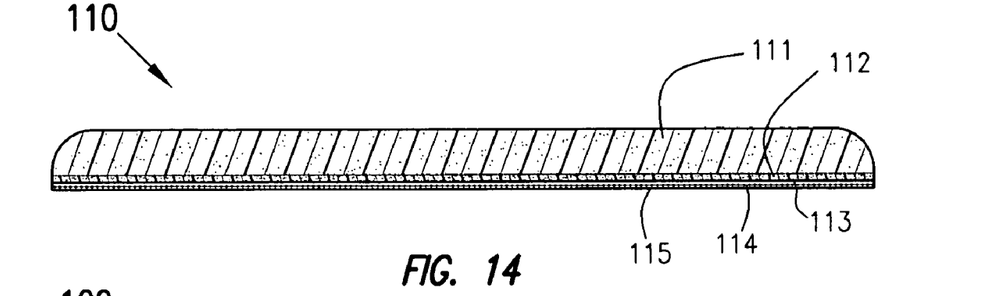
FIG. 14 is a vertical sectional view of a ninth embodiment of the sports board, taken generally on line C-C of FIG. 9.

FIG. 14 shows all but the top skin of an alternative foam sled embodiment 110. In this embodiment, the bottom skin has four laminated layers, with a plastic mesh layer 114 embedded between a polyethylene foam sheet 112 and an outer transparent polyethylene non-foam sheet 115. The mesh pattern created by layer 114 can be seen on the outside of the board through transparent film layer 115. Thus, the plastic mesh acts to enhance the synthetic appearance of the board, while also providing certain strengthening qualities to the board.

In this embodiment, layer 111 is a polyethylene foam core having the same structure and composition as layer 91 in embodiment 90. Layer 112 is a polyethylene foam layer having the same structure and composition as layer 92 in embodiment 90. Layer 113 is an adhesive resin layer having the same structure and composition as layer 52 in the third embodiment 50.

Layer 115 is a polyethylene non-foam sheet which is transparent and has a thickness in the range of about 0.2 to 1.5 mm, and preferably a thickness of about 0.5 mm. Film layer 115 has a density between about 0.91 and 0.98 g/cm$^3$, and preferably a density of about 0.95 g/cm$^3$. Polyethylene foam sheet 112 may be made with any desirable color and may further provide a contrast background for the plastic mesh pattern in layer 114.

In the preferred embodiment, layer 114 is crosshatched plastic mesh made up of spaced-apart thermal plastic fiber filaments which are interlocked together at selected intersection points. The mesh is made of two intersecting parallel arrays of fiber filaments or strands. The fibers and openings form generally parallel spaced grill-work patterns which intersect one another to form an open-crosshatched pattern.

The geometry of the mesh 114 is shown in U.S. Pat. No. 5,295,883 to Moran, entitled "Body Board With Stiffening Reinforcement" and issued Mar. 22, 2004, (the '885 patent) the entire disclosure of which is incorporated herein by reference. The '883 patent discloses a body board having a thermal plastic fiber mesh as a stiffening element. The mesh is embedded between a foam core and a bottom backing foam layer, thus two foam layers. The bonding together of these two foam layers immediately adjacent the fiber mesh occurs through the openings in the mesh. However, the heat lamination method described by the '883 patent does not form a suitably strong bond between the plastic mesh itself and the adjacent foam layers. Rather, the plastic mesh is held in place by the localized fusion bonding between the two adjacent foam layers through the openings in the mesh.

In contrast, in board 110 the fiber mesh 114 is held between a backing foam layer 112 and an outer slick skin non-foam film layer 115. By using adhesive resin layer 113, the plastic mesh layer 114 is laminated with appropriate bonding strength between a foam sheet 112 and non-foam sheet 115 using a conventional heat lamination method. Without adhesive resin layer 113, this superior bond cannot be achieved between during a conventional heat lamination process because the foam sheet is not in bonding contact with the non-foam polyethylene film through openings in the mesh because there is a large fusion temperature difference between a non-foam film and a foam sheet, and because a polyethylene non-foam sheet is far less flexible in a compression and therefore does not squeeze into the gaps or openings in the mesh. Inadequate bonding results. By applying adhesive resin layer 113, a strong bond between polyethylene foam sheet 112 and the plastic mesh 114 is achieved, and when the non-foam polyethylene film layer 115 is heat laminated to the plastic mesh 114, a strong bond is still formed between non-foam polyethylene film layer 115 and non-foam adhesive resin layer 113 through the openings in mesh 114.

Figure 19:
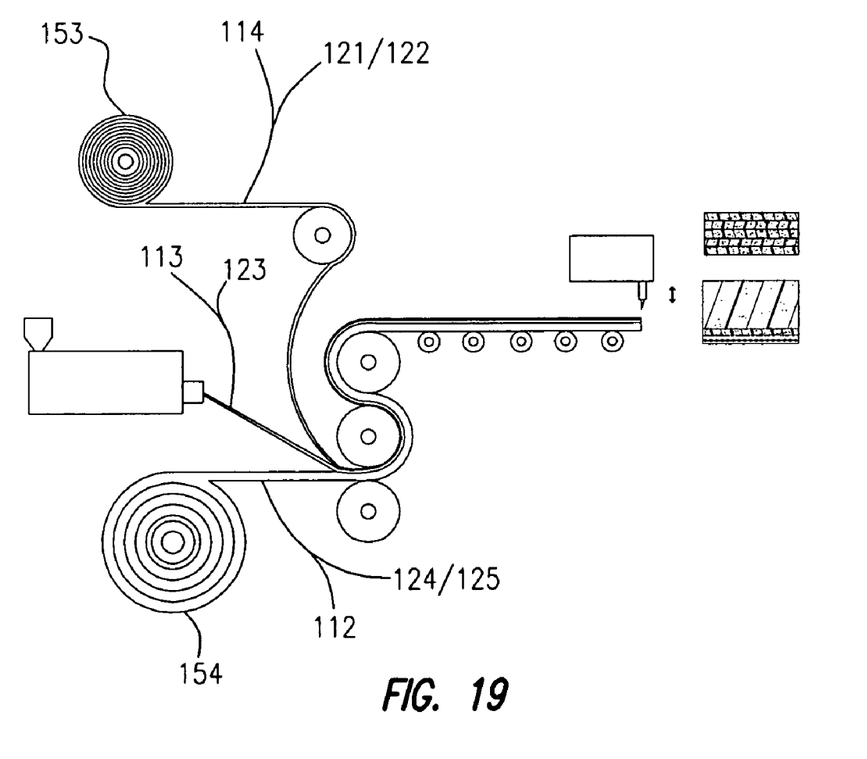
FIG. 19 is a schematic showing the process by which certain components of the sports board are laminated together.
Figure 20:
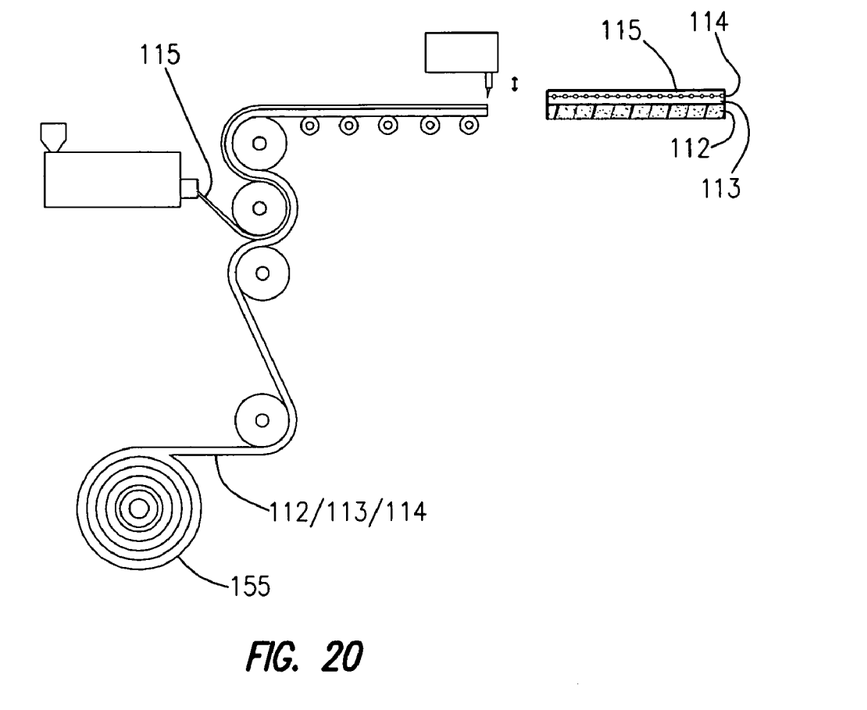
FIG. 20 is a schematic showing the process by which certain components of the sports board are laminated together.

Board 110 is formed in a series of steps. First, as shown in FIG. 19, plastic mesh 114 is fed from a top roll 153 and polyethylene foam sheet 112 is fed from a bottom roll 154. As mesh 114 and foam 112 are fed from rolls 153 and 154, respectively, hot adhesive resin layer 113 is extruded, using a conventional extrusion process, between the inner surfaces of foam layer 112 and mesh layer 114 to form a laminate sheet 112/113/114. Next, with reference to FIG. 20, laminate 112/113/114 is fed from a bottom roll 155 and polyethylene film layer 115 is extruded and with pressure applied to the exposed surface of plastic mesh layer 114 to form a bottom laminate of layers 115, 114, 113 and 112. The resulting laminate 112/113/114/115 is then cut and configured to the desired shape. The exposed surface of layer 112 is then heat laminated to the bottom surface of shaped polyethylene foam core 111 using a conventional heat lamination method, thereby forming a fully laminated board 110.

Figure 15:
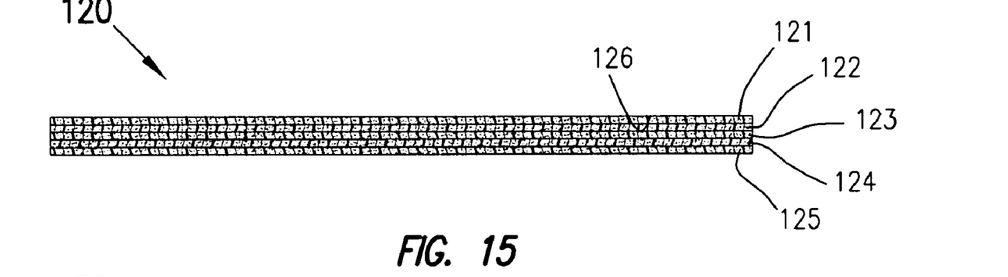
FIG. 15 is a vertical sectional view of a tenth embodiment of the sports board, taken generally on line A-A of FIG. 1.

FIG. 15 shows an alternative non-foam embodiment 120. In this embodiment, board 120 has five laminated non-foam layers with a graphic image 126 on the top surface. Outer layer 121 is a non-foam polyethylene film layer having a thickness of between about 0.02 and 0.15 mm, and preferably a thickness of about 0.07 mm. Layer 121 has a density of between about 0.91 and 0.98 g/cm$^3$, and preferably a density of about 0.95 g/cm$^3$.

Layer 122 is an inner polyethylene non-foam film layer having a thickness of between about 0.01 and 0.15 mm, and preferably a thickness of about 0.07 mm. Layer 122 has a density in the range of about 0.91 to 0.98 g/cm$^3$, and preferably a density of about 0.95 g/cm$^3$.

Layer 123 is a bonding non-foam film layer having a thickness between about 0.01 and 0.20 mm, and preferably a thickness of about 0.07 mm. Layer 123 has a density in the range of about 0.88 to 0.96 g/cm$^3$, and preferably a density of about 0.92 g/cm$^3$. In the preferred embodiment, bonding layer 123 is low density polyethylene or a blend of polyethylene and ethylene vinyl acetate.

Layer 124 is an adhesive resin layer. Adhesive resin layer 124 has a thickness of between about 0.02 and 0.3 mm, and preferably a thickness of about 0.07 mm. Layer 124 has a density of about 0.882 g/cm$^3$. In this embodiment, adhesive resin layer 124 is preferably a metallocene-based polyolefin. However, it is contemplated that other adhesive resins may be used in this application, such as methyl-acrylic copolymer, anhydride-modified polyolefin, anhydride-modified ethylene vinyl acetate, anhydride-modified low-density polyethylene, and anhydride-modified linear low-density polyethylene.

Layer 125 is a bottom plastic non-foam polyethylene sheet having a thickness of between about 0.2 and 1.5 mm, and preferably a thickness of about 0.35 mm. Plastic sheet 125 has a density of between about 0.91 and 0.98 g/cm$^3$, and preferably a density of about 0.95 g/cm$^3$.

A conventional sled sheet typically has a solid color and is made by plastic extrusion. Additional color patterns may be incorporated into the plastic sheet by adding color concentrates in a pattern configuration to the sheet surface immediately before the plastic sheet exits from the extrusion dye. However, in this embodiment, a desired graphic image 126 is printed on the inner surface of outer film layer 121. The outer film layer is then adhesively bonded to inner film layer 122 using conventional glue for form laminate 121/122. Next, plastic sheet 125 and adhesive resin layer 124 are laminated together using a conventional co-extrusion process to form laminate 124/125. With reference to FIG. 19, dual graphic film laminate 121/122 is then fed from top roller 153 and bottom laminate 124/125 is fed from a bottom roller 154. As laminate 121/122 is then fed from top roller 153 and bottom laminate 124/125 is fed from a bottom roller 154, bonding film layer 123 is extruded, using a conventional extrusion process, between laminates 121/122 and 124/125 to form a fully laminated board 120.

The application of adhesive resin layer 124 is an important component to forming the board. Without adhesive resin layer 124, a higher laminating temperature would need to be employed to facilitate fusion bonding in a plastic non-foam sheet. However, the intensive heat energy required for this generally causes excessive wrinkling of graphic film layer 121 because graphic film layer 121 is much thinner then bottom plastic sheet layer 125.

Figure 16:
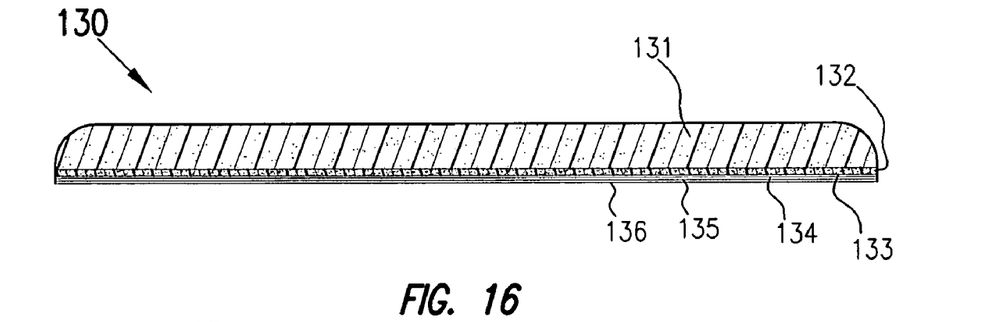
FIG. 16 is a vertical sectional view of an eleventh embodiment of the sports board, taken generally on line C-C of FIG. 9.

FIG. 16 shows all but the top skin of an alternative foam sled embodiment 130. In this embodiment, the bottom skin comprises five layers with a graphic image 137 printed on the inner surface of layer 134. Layer 131 has the same structure and composition as layer 84 in the sixth embodiment 80. Layer 132 has the same structure and composition as layer 85 in the sixth embodiment 80. Layer 135 has the same structure and composition as layer 86 in the sixth embodiment 80. Layer 136 has the same structure and composition as layer 88 in the sixth embodiment 80.

Inner layer 133 is a non-foam polyethylene film layer having a thickness of between about 0.01 and 0.15 mm, and preferably a thickness of about 0.07 mm. Layer 133 has a density of between about 0.91 and 0.98 g/cm$^3$, and preferably a density of about 0.95 g/cm$^3$.

Layer 134 is an outer non-foam polyethylene film layer having a thickness of between about 0.02 and 0.15 mm, and preferably a thickness of about 0.07 mm. Layer 134 has a density in the range of about 0.91 to 0.98 g/cm$^3$, and preferably a density of about 0.95 g/cm$^3$.

A conventional foam sled having a graphic image imprinted on the bottom surface typically has the same construction as FIG. 16, but without the adhesive resin layer 135. With such prior art boards, polyethylene sheet 136 is applied to the surface of outer polyethylene film 134 by extruding a hot sheet of molten polyethylene and disposing it directly on the surface of polyethylene film 134. However, due to the greater thickness of the molten polyethylene sheet, the heat capacity associated with the thicker polyethylene sheet is sufficient to partially melt the polyethylene film 134, which is much thinner, resulting in wrinkling and defects caused by heat shrinkage. If the extrusion temperature of the polyethylene sheet is too low, an improper fusion bonding may result. Therefore the extrusion in the prior art must be carefully controlled to a high and narrow temperature range in the laminating process, adding expense and increased risk of error.

In contrast, with improved board 130, the melting point of adhesive resin layer 135 is low and has a broader range of fusion temperatures. By applying adhesive resin layer 135, a strong bond between polyethylene film 134 and polyethylene sheet 136 is achieved with no wrinkling of graphic film layer 134, thereby significantly improving the graphic definition on the bottom of the sled.

Figure 21:
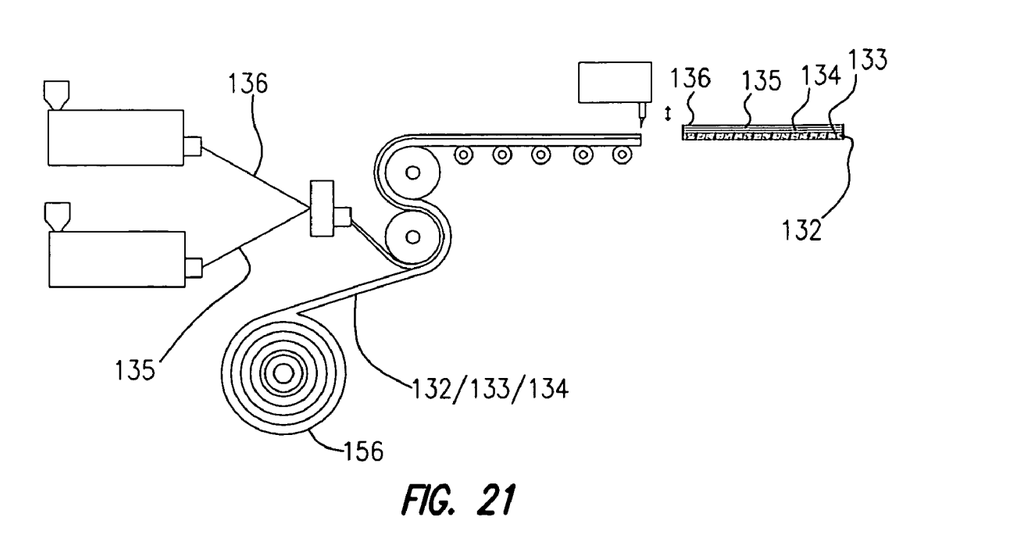
FIG. 21 is a schematic showing the process by which certain components of the sports board are laminated together.

Board 130 is formed in series of steps. First, a desired graphic image 137 is printed on the inner surface of outer film layer 134. The outer film layer is then adhesively bonded to inner film layer 133 using conventional glue to form laminate 133/134. Laminate 133/134 is then conventionally heat laminated to polyethylene foam sheet 132 to form a laminate sheet 132/133/134. As shown in FIG. 21, the resulting laminate sheet 132/133/134 is then fed from a roller 156 as resin layer 135 and polyethylene sheet layer 136 are co-extruded, using a conventional co-extrusion process, onto the exposed surface of layer 134 to form a laminate sheet 132/133/134/135/136. The exposed surface of layer 132 in laminated sheet 132/133/134/135/136 is then conventionally heat laminated to the bottom surface of foam core 131 to form the bottom skin of the board.

While certain these embodiments include graphics imprinted on a single film layer, the graphics may be provided in a dual layered graphic film layer as an alternative. Thus, whereas in the single layered embodiments shown herein the graphics are applied to the inner surface of a single polyolefin film layer, which is then laminated to an adhesive resin layer, a dual system may be used alternatively. In a dual system, a first outer polyolefin film layer having a thickness in the range of about 0.02 to 0.15 mm, and preferably a thickness of about 0.07 mm, is provided with graphics on its inner surface. This inner surface is then laminated to a second inner polyolefin inner film layer having a thickness of about 0.02 to 0.15 mm, and preferably a thickness of 0.07 mm. Thus, the graphic surface is laminated between two non-foam film layers. The adhesive resin layer is then applied to the inner surface of the second inner polyolefin film layer.

The present invention contemplates that many changes and modifications may be made. Therefore, while the presently preferred form of the sports board and alternate embodiments have been shown and described, and certain modifications discussed, persons skilled in this art will readily appreciate that various additional changes and modifications may be made without departing from the spirit of the invention, as defined and differentiated by the following claims.

What is claimed is:

1. A sports board comprising:
    an elongated expanded closed-cell polyolefin foam layer having a foam thickness, a foam density and opposed surfaces;
    a first polyolefin non-foam layer having a thickness less than said foam thickness, a density greater than said foam density and having an inner surface and an outer surface relative to said foam layer;
    an intermediate non-foam metallocene-based polyolefin layer having an inner surface and an outer surface relative to said foam layer, a thickness less than said foam thickness and a density greater than said foam density;
    said intermediate layer bonded on said inner surface to said foam layer and bonded on said outer surface to said inner surface of said first layer.

2. The board set forth in claim 1, wherein said intermediate layer comprises an ethylene-alpha olefin copolymer.

3. The board set forth in claim 2, wherein said intermediate layer comprises a copolymer of ethylene and octene.

4. The board set forth in claim 1, wherein said foam layer comprises a homopolymer or copolymer of polyethylene, polypropylene and ethyl vinyl acetate.

5. The board set forth in claim 1, wherein said first layer comprises a homopolymer or copolymer of polyethylene and polypropylene.

6. The board set forth in claim 1, and further comprising a graphically imprinted layer bonded to said outer surface of said first layer.

7. A sports board comprising:
    an elongated expanded closed-cell polyolefin foam layer having a foam thickness, a foam density and opposed surfaces;
    a non-foam mesh layer having a pattern defined by thermoplastic material and openings in said material;
    an intermediate non-foam metallocene-based polyolefin layer between said foam layer and said mesh layer and having a density greater than said foam density.

8. The sports board set forth in claim 7, wherein said intermediate layer comprises an ethylene-alpha olefin copolymer.

9. The board set forth in claim 7, wherein said intermediate layer comprises a copolymer of ethylene and octene.

10. The board set forth in claim 7, wherein said foam layer comprises a homopolymer or copolymer of polyethylene, polypropylene and ethyl vinyl acetate.

11. The board set forth in claim 7, and further comprising a polyolefin film layer thermally bonded to said mesh layer.

* * * * *